United States Patent [19]

Koeller

[11] 4,142,825
[45] Mar. 6, 1979

[54] DRAFT TUBE AERATION WITH EDUCTOR

[75] Inventor: Paul Koeller, Dorval, Canada

[73] Assignee: Dominion Engineering Works Limited, Lachine, Canada

[21] Appl. No.: 845,543

[22] Filed: Oct. 26, 1977

[30] Foreign Application Priority Data

Nov. 26, 1976 [CA] Canada .................................. 266671

[51] Int. Cl.² .............................................. F01D 25/30
[52] U.S. Cl. ...................................... 415/116; 60/696; 415/119
[58] Field of Search ............... 415/116, 117, 500, 119; 60/686, 689, 696; 417/71, 78, 87, 91

[56] References Cited

U.S. PATENT DOCUMENTS

| 2,300,748 | 11/1942 | Rheingans | 60/696 |
| 3,044,744 | 7/1962 | Berlyn | 415/117 |
| 3,047,267 | 7/1962 | Peyrin | 60/696 |
| 3,238,534 | 3/1966 | Hartland | 415/116 |
| 3,292,901 | 12/1966 | Donaldson | 60/696 |

Primary Examiner—Louis J. Casaregola
Attorney, Agent, or Firm—R. A. Eckersley

[57] ABSTRACT

An arrangement for introducing air into the draft tube of turbo-hydraulic machines, in order to promote smooth running at part-load and to facilitate the achievement of full load, relies upon the use of a protective plate in covering relation with the air admission opening and cooperating with the structure located within the draft tube to act as an air eductor, in the manner of a venturi.

4 Claims, 5 Drawing Figures

U.S. Patent   Mar. 6, 1979   Sheet 1 of 2   4,142,825
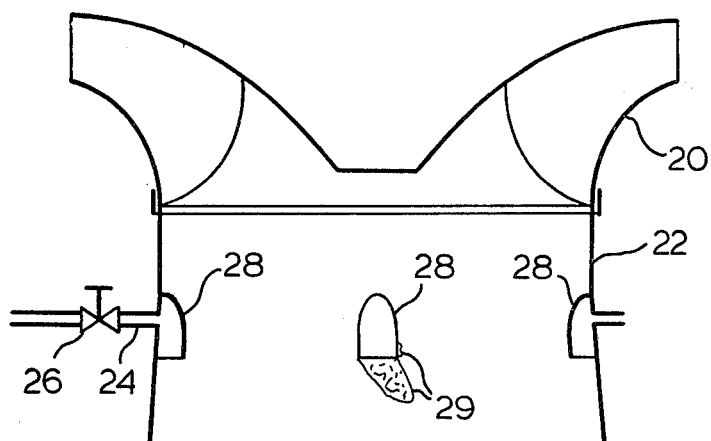
FIG. 1 (PRIOR ART)
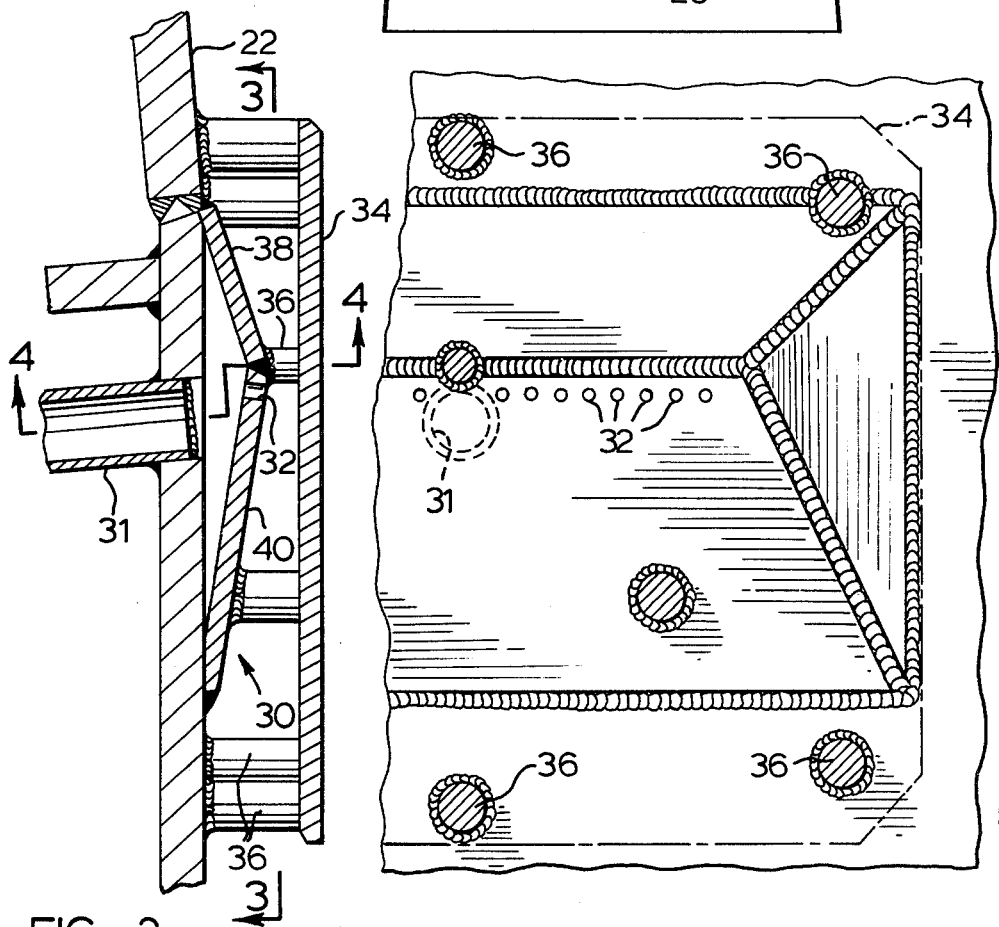
FIG. 2
FIG. 3
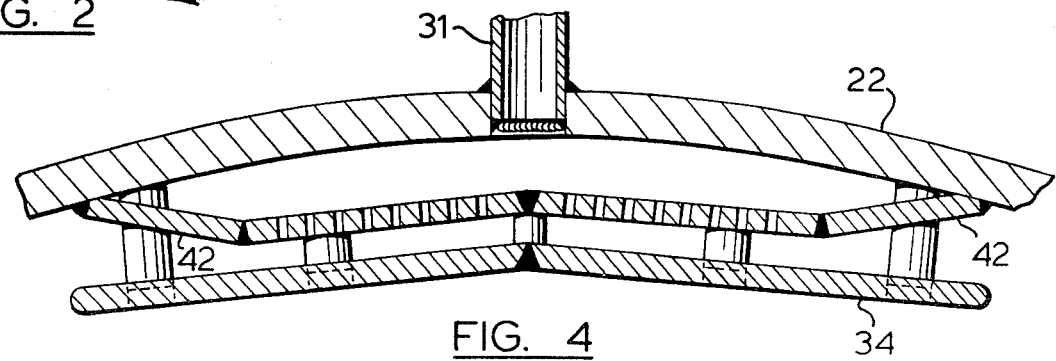
FIG. 4

DRAFT TUBE AERATION WITH EDUCTOR

This invention is directed to a turbo hydraulic machine, and in particular to the provision of draft-tube aeration means.

The smooth functioning of turbo machines, such as Francis turbines, operating on part load can be facilitated and be made smoother, quieter, and more reliable by the provision of aeration means for introducing suitable quantities of air at appropriate times into the draft tube of the machine.

In the prior art many types of device have been used for purposes of controlling the swirling vortex ropes of air and water vapor which evolve under part load conditions, within the draft tube and which can prove quite wearing and destructive, as well as contributing significantly to environmental noise polution.

One prior arrangement relied upon the use of a plurality of small elbows connecting through the wall of the draft tube to an air-supply, having the elbow outlets turned downwardly for the passage of air therethrough. This earlier arrangement has not proven to be unreservedly successful, and the present application is directed to a more satisfactory solution.

The present invention provides an aeration arrangement for use within the draft tube of a turbo hydraulic machine, having a plurality of dispersed air flow passages, including a cover plate mounted in spaced relation therefrom to provide a venturi effect so as to act as an eductor and induce the flow of air into the draft tube, under the influence of water flow within the draft tube.

Certain embodiments of the invention are described, reference being made to the accompanying drawings wherein;

FIG. 1 is a schematic sketch portrayal of a diametrical elevation of a prior art arrangement of a machine embodying the previously described elbow entry arrangement;

FIG. 2 is a sectional view of a venturi outlet arrangement according to the present invention;

FIG. 3 is a sectional view taken at 3—3 of FIG. 2;

FIG. 4 is a sectional plan view taken at 4—4 of FIG. 2 and

Figure 5:
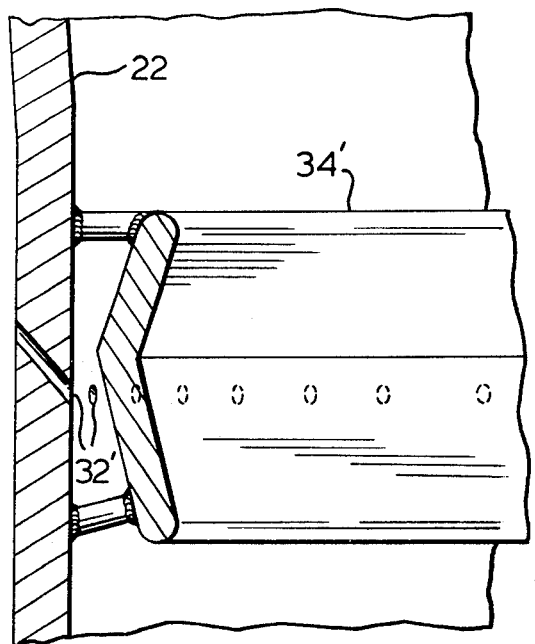
FIG. 5 is a view similar to FIG. 2 of an annular embodiment utilising a venturi ring.

Referring first to the prior art arrangement portrayed schematically in FIG. 1, which will be self evident to one skilled in the art, the machine, illustrated as being a turbine of the Francis type, has a runner 20 discharging into a draft tube 22.

Air is supplied by way of a pipe 24 through a throttle valve 26 to a plurality of modified elbows 28 located within the draft tube 22 below the runner 20. Evidence of the location of cavitation damage is portrayed at locations 29.

Turning to FIGS. 2, 3 and 4 there is shown one of a plurality of air boxes 30, illustrated as being located within the draft tube 22, having an air supply pipe 31 connecting through the draft tube wall. A plurality of small air holes 32 connects the air box 30 to the interior of draft tube 22.

A flow control plate 34 overlying the box 30 and secured by spacers 36 cooperated with the air box front plates 38, 40 to provide a substantially vertically oriented flow path of convergent-divergent cross-section, as seen in FIG. 2, having a throat at the juncture of plates 38, 40. The air holes 32 are located below and closely adjacent the throat, to thereby benefit from the eductive or venturi effect.

In this arrangement the need of compressed air may be dispensed with, and air at atmospheric pressure can be drawn into the draft tube in quantities sufficient to provide the desired flow stabilization.

Viewing the arrangement in relation to FIG. 4 it will be seen that transverse flow components passing left to right or right to left may also produce a limited venturi effect, due to the cooperation of the two outer side portions of control plate 34 with the facing ramped side plates 42. Thus the existence of any rotating rope-like flow components tends to promote the eduction of additional air flow into the draft tube 22.

Referring to the FIG. 5 embodiment which utilises an annular venturi ring it is contemplated that the air box, or an equivalent thereto may be provided outside the draft tube 22. By suitable shaping of the annular venturi ring 34' the requisite venturi effect may be produced in relation to the outlets of the air box equivalent, through the wall of the draft tube 22, to induce air flow in the fashion previously disclosed herein. Thus, the ring 34' would be shaped to produce a typical convergent-divergent flow path, having the throat thereof located in close proximity to, and above the air inlet holes. This provision lends itself to a partial or fully annular arrangement. The use of check-valves with respective air inlet supplies, such as at the individual holes 32' or provision to drain any localised reverse water flow makes allowance for local high pressure zones such as the rotating "rope" referred to above. Inward and downward inclination of the air supply holes 32' contributes a significant impedence to reversed water flow.

one of the particular advantages of the embodiment illustrated in FIGS. 2, 3 and 4 is that any cavitation effects which may prove to be present under long usage would be primarily restricted to the replaceable structure of the air boxes and flow control plates.

What I claim as new and desire to secure by Letters Patent of the United States is:

1. A turbo hydraulic machine of the type including pumps, pump-turbines and turbines of the Francis type, having an impeller, and a draft tube located therebeneath for the passage of liquid therethrough, air supply means connected to said machine to provide air thereto, and air admission means located within said draft tube substantially at the wall thereof having a plurality of discrete shrouded apertures spaced about the inner periphery of the draft tube connected to said air supply means each said aperture comprising a venturi arrangement having an inclined plate member in airflow inducing relation responsive to the flow of working liquid therepast to supply air to the draft tube in flow stabilizing relation with liquid flowing therethrough.

2. A turbo hydraulic machine of the type including pumps, pump-turbines and turbines of the Francis type, having an impeller, and a draft tube located therebeneath for the passage of liquid therethrough, air supply means connected to the machine to provide air thereto, and air admission means located within the draft tube substantially at the wall thereof comprising a plurality of air boxes located in spaced array about the inner surface of the draft tube, each box having a line of air outlets therefrom, and shroud means arranged in spaced cooperating relation with the surfaces of the box to provide a venturi arrangement responsve to the flow of said liquid along the draft tube, the line of air outlets being positioned closely adjacent the throat of the venturi arrangement to provide in operation an air eductive effect in cooperation therewith.

3. A turbo hydraulic machine of the type including pumps, pump-turbines and turbines of the Francis type, having an impeller, and a draft tube located therebeneath for the passage of liquid therethrough, air supply means connected to the machine to provide air thereto, and air admission means comprising at least one row of holes extending through at least a portion of the periphery of the draft tube, and water deflection means in spaced relation extending substantially parallel with the row of holes to define a convergent-divergent liquid flow path having a throat portion thereof located upstream of holes in adjacent relation thereto to provide in operation an air eductive effect in cooperation therewith.

4. The machine as claimed in claim 3, said water deflection means extending as an annular band about the inner periphery of said draft tube.

* * * * *